(12) United States Patent
Hyde et al.

(10) Patent No.: US 8,973,286 B1
(45) Date of Patent: Mar. 10, 2015

(54) VACUUM ASSISTED DRYER SYSTEMS AND METHODS

(71) Applicant: Elwha LLC, Bellevue, WA (US)

(72) Inventors: Roderick A. Hyde, Redmond, WA (US); Thomas A. Weaver, San Mateo, CA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

(21) Appl. No.: 14/165,332

(22) Filed: Jan. 27, 2014

(51) Int. Cl.
*D06F 58/20* (2006.01)

(52) U.S. Cl.
CPC ................................. *D06F 58/206* (2013.01)
USPC .................. 34/595; 34/601; 34/606; 34/610; 68/5 C; 68/5 R; 8/149; 8/158; 134/104.1

(58) Field of Classification Search
USPC ........ 34/595, 601, 606, 610; 68/5 C, 5 R, 19, 68/20; 8/139, 149, 158; 134/34, 104.1
See application file for complete search history.

(56) References Cited

U.S. PATENT DOCUMENTS

| | | | |
|---|---|---|---|
| 2,555,821 A | 6/1951 | Smith | |
| 3,308,553 A | 3/1967 | Lambert | |
| 3,392,457 A | 7/1968 | Lambert | |
| 3,416,334 A | 12/1968 | Candor et al. | |
| 3,425,136 A | 2/1969 | Lambert | |
| 3,859,735 A | 1/1975 | Katterjohn, Jr. | |
| 4,041,614 A | 8/1977 | Robinet | |
| 4,057,907 A | 11/1977 | Rapino et al. | |
| 4,063,590 A | 12/1977 | McConnell | |
| 4,257,173 A | 3/1981 | Smith | |
| 4,471,537 A | 9/1984 | Meda | |
| 4,488,364 A | 12/1984 | Herschel | |
| 4,556,105 A | 12/1985 | Boner | |
| 4,603,489 A | 8/1986 | Goldberg | |
| 4,615,125 A | 10/1986 | Wyborn | |
| 4,621,438 A * | 11/1986 | Lanciaux | 34/77 |
| 4,800,655 A * | 1/1989 | Mori et al. | 34/77 |
| 5,117,563 A | 6/1992 | Castonguay | |
| 5,343,632 A | 9/1994 | Dinh | |
| 5,724,750 A | 3/1998 | Burress | |
| 5,806,204 A * | 9/1998 | Hoffman et al. | 34/92 |

(Continued)

FOREIGN PATENT DOCUMENTS

WO     WO 2010-114332     10/2010

OTHER PUBLICATIONS

PCT International Search Report; International App. No. PCT/US2013/071695; Feb. 27, 2014; pp. 1-3.

(Continued)

*Primary Examiner* — Steve M Gravini
(74) *Attorney, Agent, or Firm* — Foley & Lardner LLP

(57) ABSTRACT

Dryers and methods of using dryers are described herein. The dryer includes a housing, a drying chamber disposed within the housing, and a heating element. The dryer further includes an intake configured to supply intake air to the drying chamber. The dryer includes an exhaust configured to vent exhaust air out of the drying chamber. The dryer includes a pump coupled to the housing. The dryer further includes an energy recovery system coupled to the housing. The pump is configured to reduce the air pressure within the drying chamber. The energy recovery system includes a heat transfer fluid and is configured to use the heat transfer fluid to transfer thermal energy from the exhaust air to the drying chamber.

34 Claims, 6 Drawing Sheets

(56) References Cited

U.S. PATENT DOCUMENTS

| | | | |
|---|---|---|---|
| 6,557,266 B2 * | 5/2003 | Griffin | 34/168 |
| 6,784,997 B2 * | 8/2004 | Lorenz et al. | 356/429 |
| 6,941,680 B1 | 9/2005 | Zielewicz et al. | |
| 7,055,262 B2 * | 6/2006 | Goldberg et al. | 34/86 |
| 7,194,823 B2 * | 3/2007 | Nakamoto et al. | 34/526 |
| 7,197,838 B2 | 4/2007 | Jo | |
| 7,213,349 B1 | 5/2007 | Brunner | |
| 7,347,009 B2 | 3/2008 | Ahn et al. | |
| 7,866,061 B2 * | 1/2011 | Tatsumi et al. | 34/595 |
| 7,908,766 B2 * | 3/2011 | Ahn et al. | 34/595 |
| 8,240,064 B2 * | 8/2012 | Steffens | 34/480 |
| 8,266,824 B2 * | 9/2012 | Steiner | 34/595 |
| 8,353,114 B2 * | 1/2013 | Beers et al. | 34/343 |
| 8,601,717 B2 * | 12/2013 | Beers et al. | 34/419 |
| 2004/0143987 A1 | 7/2004 | Phillips | |
| 2005/0066538 A1 | 3/2005 | Goldberg et al. | |
| 2006/0117593 A1 | 6/2006 | Ahn et al. | |
| 2006/0179676 A1 | 8/2006 | Goldberg et al. | |
| 2006/0266506 A1 | 11/2006 | Lee et al. | |
| 2006/0266507 A1 | 11/2006 | Eom et al. | |
| 2006/0288602 A1 | 12/2006 | Lee et al. | |
| 2008/0110041 A1 | 5/2008 | Ehlers | |
| 2008/0110044 A1 | 5/2008 | Ehlers | |
| 2008/0113609 A1 | 5/2008 | Ehlers | |
| 2012/0084995 A1 | 4/2012 | Vogel | |
| 2013/0192085 A1 * | 8/2013 | Moschutz et al. | 34/491 |
| 2013/0255331 A1 * | 10/2013 | Bommels et al. | 68/5 R |

OTHER PUBLICATIONS

"Ventless Dryer Guide"; LG Washer Dryer; printed on Apr. 8, 2013; p. 1-2; FJS Distributors; located at http://lgwasherdryer.com/ventless-dryer-guide/.

\* cited by examiner

VACUUM ASSISTED DRYER SYSTEMS AND METHODS

CROSS-REFERENCE TO RELATED APPLICATIONS

This application is related to U.S. application Ser. No. 13/687,836, entitled "ENERGY EFFICIENT DRYER SYSTEMS," filed on Nov. 28, 2012, which is hereby incorporated by reference in its entirety and for all purposes.

BACKGROUND

A standard clothes dryer is one of the highest energy consuming home appliances (e.g., a dryer can consume five kW when operating). A clothes dryer generally works by passing heated, dry air over wet articles of clothing and venting heated exhaust air containing water vapor emitted from the wet articles of clothing. The inlet air is generally heated by an electric or gas powered heater. The wet articles of clothing are placed in a tumbler, and the heated air is drawn into the tumbler and passed over and through the articles of clothing. The heated air heats the articles of clothing and any water contained within. Typically, the drying process occurs at or near the ambient air pressure and at a higher than ambient air temperature. Once the water is vaporized, water vapor is carried out of the tumbler with the heated air. The high operating temperatures of the dryer drive up energy costs and may damage the articles being dried.

Businesses, such as hotels, laundromats, and clothes cleaners, utilize large, commercial sized dryers. Further, industrial dryers operating on similar principles play substantial roles in various manufacturing areas, including textile manufacturing, food processing, and pharmaceuticals. Industrial dryers may take on a slightly different configuration than their clothes dryer counterparts. For example, an industrial dryer may replace a tumbling mechanism with a conveyor. However, industrial dryers operate on the same basic principles: passing heated dry air over damp articles to carry away water. Still further, other home appliances, such as dishwashers, rely on heated drying cycles.

SUMMARY

One embodiment relates to a dryer. The dryer includes a housing, a drying chamber disposed within the housing, and a heating element. The dryer further includes an intake configured to supply intake air to the drying chamber. The dryer includes an exhaust configured to vent exhaust air out of the drying chamber. The dryer includes a pump coupled to the housing. The dryer further includes an energy recovery system coupled to the housing. The pump is configured to reduce the air pressure within the drying chamber. The energy recovery system includes a heat transfer fluid and is configured to use the heat transfer fluid to transfer thermal energy from the exhaust air to the drying chamber.

Another embodiment relates to a dryer. The dryer includes a housing, a drying chamber disposed within the housing, and a heating element. The dryer further includes an intake configured to supply intake air to the drying chamber. The dryer includes an exhaust configured to vent exhaust air out of the drying chamber, wherein the exhaust includes an opening configured to vent the exhaust air out of the housing. The dryer further includes an energy recovery system having at least a portion positioned along the exhaust. The dryer includes a first pump coupled to the housing and positioned along the exhaust between the portion of the energy recovery system and the drying chamber and a second pump coupled to the housing and positioned along the exhaust between the portion of the energy recovery system the opening. The first pump and the second pump are configured to reduce the air pressure within the drying chamber to a low pressure that is below an ambient pressure. The energy recovery system includes a heat transfer fluid and is configured to use the heat transfer fluid to transfer thermal energy from the exhaust air to the drying chamber.

An additional embodiment relates to a clothes dryer. The clothes dryer includes a housing, a drying chamber disposed within the housing, wherein the drying chamber disposed within the housing, and a heating element. The clothes dryer further includes an intake configured to supply intake air to the drying chamber and an exhaust configured to vent exhaust air out of the drying chamber. The clothes dryer includes a first pump coupled to the housing and positioned along the exhaust. The clothes dryer further includes an energy recovery system coupled to the housing. The first pump is configured to reduce the air pressure within the drying chamber. The energy recovery system is configured to use a heat transfer fluid to transfer thermal energy from the exhaust air to the drying chamber.

Yet a further embodiment relates to a method of drying articles in a dryer. The method includes receiving articles in a drying chamber of the dryer. The method further includes activating a pump configured to decrease the air pressure within the drying chamber. The method includes heating the drying chamber with a heating element of the dryer. The method further includes recovering thermal energy from an exhaust from the drying chamber by an energy recovery system of the dryer. The method includes providing thermal energy from the exhaust to the drying chamber by the energy recovery system.

The invention is capable of other embodiments and of being carried out in various ways. Alternative exemplary embodiments relate to other features and combinations of features as may be generally recited in the claims.

The foregoing is a summary and thus by necessity contains simplifications, generalizations, and omissions of detail. Consequently, those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Figure 1:
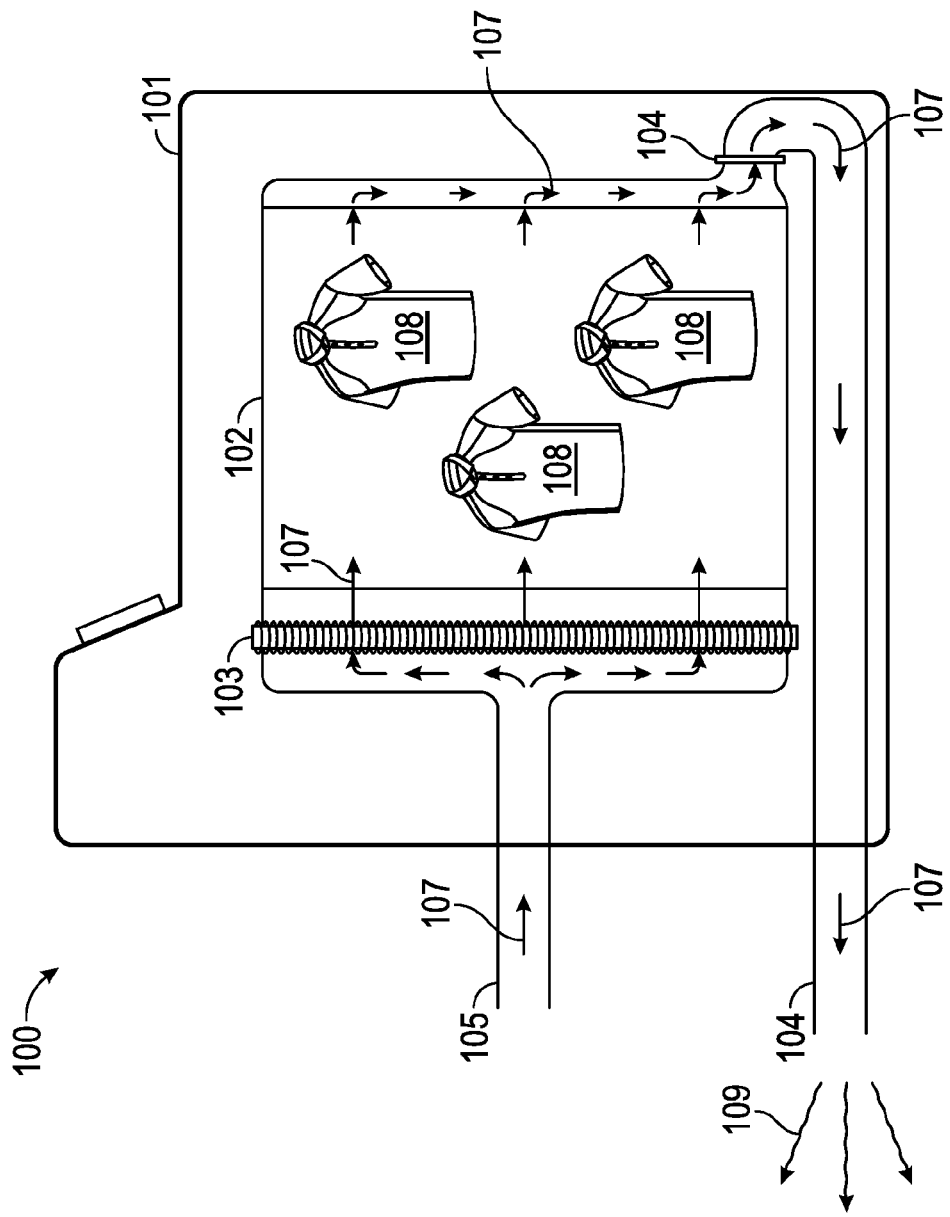
FIG. 1 is a schematic view of a clothes dryer.

Referring to FIG. 1, a schematic view of a traditional clothes dryer 100 is shown. Clothes dryer 100 has a housing 101 that houses tumbler 102, heating element 103, a series of air routing pipes, and lint trap 104. The air routing pipes include air intake 105 and air exhaust 104 Air 107 enters the clothes dryer 100 through intake 105 such that air 107 is routed over heating element 103. Heating element 103 is typically an electric heating element or a gas heating element. Heating element 103 heats air 107. Heated air 107 then is routed through tumbler 102 where heated air 107 is passed over clothing 107. Air 107 heats up clothing 108 and any water within clothing 108. As the water within the clothing is heated, it begins to evaporate at a faster rate than at ambient temperature, and air 107 picks up water vapor emitted by clothing 108 and carries the water vapor out of tumbler 102. The water vaporization occurs at approximately 1 bar of air pressure. Air 107 then passes through lint trap 104 and out of clothes dryer housing 101 through exhaust 106. Air 107 exits exhaust 106 and typically enters the environment outside of the building housing clothes dryer 100.

Air 107 leaving exhaust 106 is generally warmer than the ambient air temperature. Further, exhaust air 107 typically includes water vapor. Energy 109 is lost by clothes dryer 100 when exhaust air 107 leaves clothes dryer 100. The temperature difference between ambient air and the exhaust air 107 represents a potential loss of sensible thermal energy. Further, water vapor contained within exhaust air 107 represents a potential loss of latent thermal energy stored in the phase change of the water from liquid to water vapor.

Figure 2:
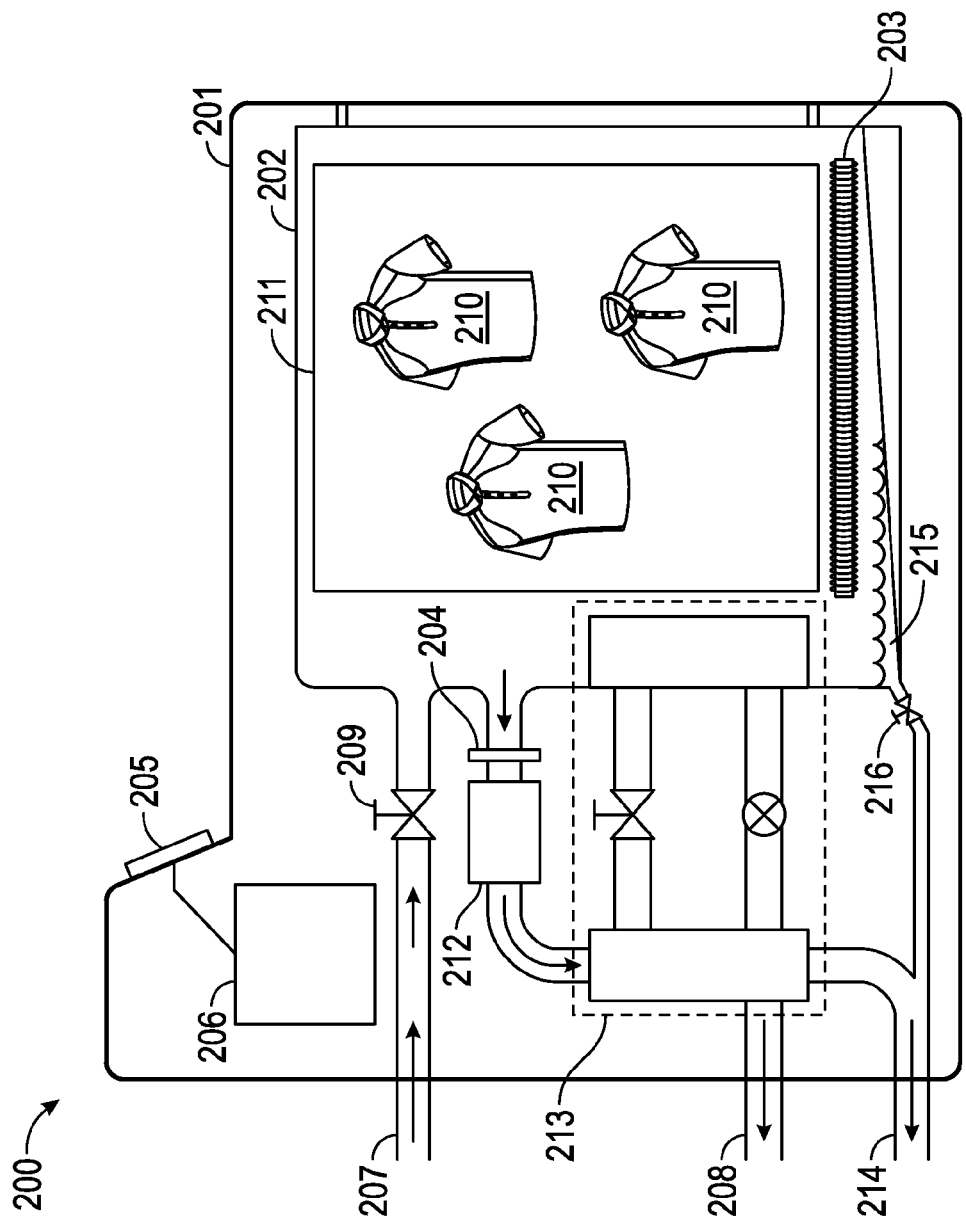
FIG. 2 is a schematic view of a vacuum assisted clothes dryer.

Referring to FIG. 2, a view of a vacuum assisted clothes dryer 200 is provided. Clothes dryer 200 includes a housing 201 that houses a drying chamber 202, heating element 203, a series of air routing pipes, and lint trap 204. User interface 205 is located on the exterior of housing 201. Housing 201 additionally contains controller 206. The air routing pipes include intake 207 and exhaust 208. Intake 207 provides air from the ambient environment into drying chamber 202. Intake 207 includes intake damper 209. As described below, damper 209 may be closed during operation of dryer 200 to assist in reducing the air pressure in drying chamber 202. Damper 209 may be periodically opened during a drying cycle in order to provide fresh air to drying chamber 202.

Air within drying chamber 202 is heated by heating element 203. Heating element 203 may be an electric heating element or a gas heating element. Heating element 203 may be located within drying chamber 202 and/or within intake 207, or thermally connected to them. Heating element 203 heats drying chamber 202, air within drying chamber 202, and articles 210 within drying chamber 202 (shown as articles of clothing). As articles 210 are heated, liquid water contained within articles 210 vaporizes into the air within drying chamber 202 at a faster pace than if articles 210 remain at ambient temperature. The drying process may be aided through the use of tumbling mechanism 211 within drying chamber 202.

Exhaust 208 discharges air and water vapor from drying chamber 202. Air and water vapor are forced from drying chamber 202 out exhaust 208 by pump 212. Pump 212 is configured to evacuate air from drying chamber 202. Pump 212 may completely evacuate air from drying chamber 202 or partially evacuate air from drying chamber 202. Pump 212 may be a vacuum pump, a blower, a fan, or the like. As the air and water vapor are pumped out and away from drying chamber 202, the air and water vapor encounter energy recovery system 213. Lint trap 204 may be located upstream of pump 212 and energy recovery system 213 to prevent lint from entering pump 212 or energy recovery system 213. Energy recovery system 213 captures energy from the air and the water vapor prior to the air and the water vapor exiting through exhaust 208. Energy recovery system 213 may capture both sensible thermal energy, which causes a temperature drop in the air, and latent thermal energy, which is released as the water vapor condenses to liquid water. The details of energy recovery system 213 are described below with respect to FIG. 3. Condensed water can be removed from the system and drained through drain 214. Liquid water 215 that accumulates in drying chamber 202 may also exit dryer 200 through drain 214. Accordingly, valve 216 may be opened after the drying cycle is complete to allow water 215 to exit. Alternatively, a pump is used in place of valve 216 that can be used to pump liquid water 215 out of the low-pressure environment of drying chamber 202 to the higher, ambient-pressure environment outside of housing 201 during the drying operation.

Figure 3:
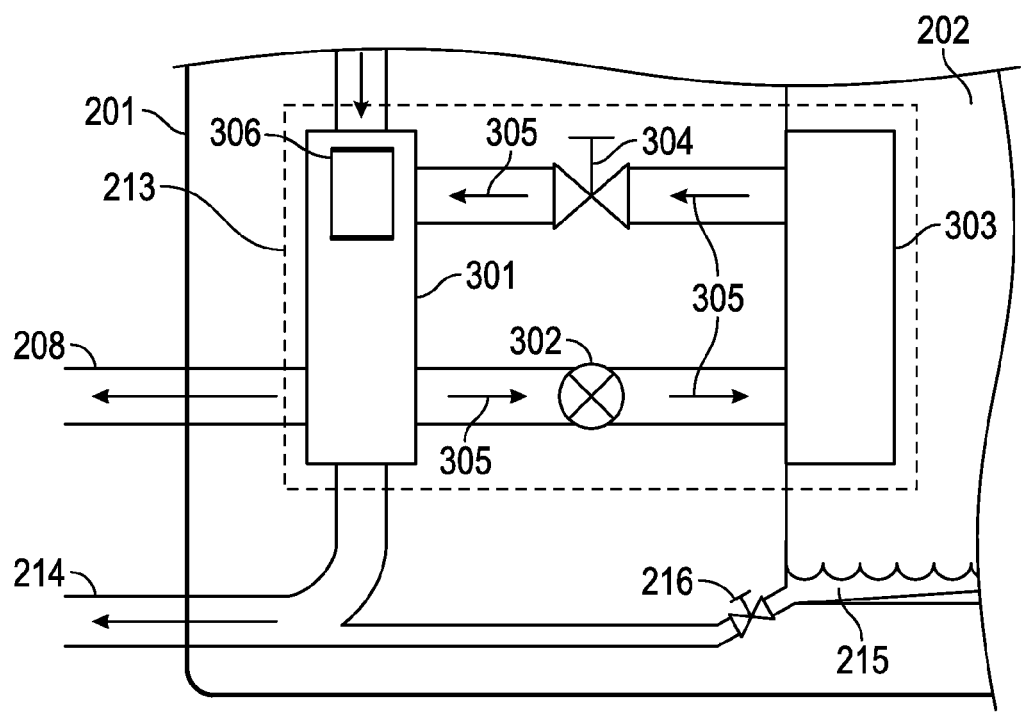
FIG. 3 is a detailed view of an energy recovery system of the clothes dryer of FIG. 2.

Referring to FIG. 3, a detailed view of energy recovery system 213 is shown. Energy recovery system 213 generally contains a heat pump loop (formed by evaporator 301, compressor 302, condenser 303, expansion valve 304, and heat transfer fluid 305; all operatively connected through hoses and/or pipes). The air and water vapor exiting drying chamber 202 is forced into energy recovery system 213 by pump 212. Evaporator 301 is configured to transfer sensible thermal energy from the air and water vapor and latent thermal energy released from the water vapor as it condenses into liquid water to heat transfer fluid 305. Water vapor condenser 306 is located within exhaust 208 and causes a portion of water vapor of the water vapor contained in the air to condense into liquid water. Water vapor condenser 306 transfers latent thermal energy from this condensation to evaporator 301. Liquid water formed by condensing water vapor may exit dryer 200 through drain 214. Evaporator 301 may be located outside of drying chamber 202. Evaporator 301 may be located within housing 201 along exhaust 208 in between drying chamber 202 and the exit outside of housing 201. Alternatively, evaporator 301 may be located external to housing 201. Heat transfer fluid 305 moves to condenser 303. Condenser 303 is configured to transfer thermal energy from heat transfer fluid 305 to drying chamber 202. Condenser 303 may be located within drying chamber 202. Alternatively, condenser 303 may be located adjacent to drying chamber 202. After passing through condenser 303, heat transfer fluid 305 is expanded through expansion valve 304 and back into evaporator 301, where the cycle repeats.

In an alternative arrangement, energy recovery system 213 does not include a heat pump loop, and instead includes another fluid heat transfer system. In one such arrangement, evaporator 301 and condenser 303 are replaced with heat exchangers, expansion valve 304 is eliminated, and condenser 303 is replaced by a pump that circulates heat transfer fluid 305. In yet another alternative arrangement, energy recovery system 213 includes a heat exchanger. The heat exchanger may be a gas heat exchanger or a liquid heat exchanger. In another alternative arrangement, energy recovery system includes a heat pipe to transfer thermal energy from exhaust 208 to drying chamber 202 using an internally confined heat transfer fluid.

Referring again to FIG. 2, dryer 200 operates at two different air pressures. Dryer 200 operates at approximately ambient air pressure outside of drying chamber 202 and a less-than-ambient air pressure within drying chamber 202. Pump 212 is configured to reduce the air pressure within drying chamber 202 to a pressure below the ambient air pressure by completely or partially evacuating air from drying chamber 202. By reducing the air pressure within drying chamber 202, the water contained within articles 210 evaporates at a faster pace than it would at an ambient pressure. Accordingly, by reducing the air pressure within drying chamber 202, dryer 200 can operate at a lower temperature than dryer 100 and/or achieve faster drying cycles. Because dryer 200 operates at a lower temperature than dryer 100, dryer 200 may consume less energy than dryer 100. Further, articles 210 are exposed to less heat thereby reducing the risk of damaging articles 210 through unnecessary exposure to higher heat levels.

Figure 4:
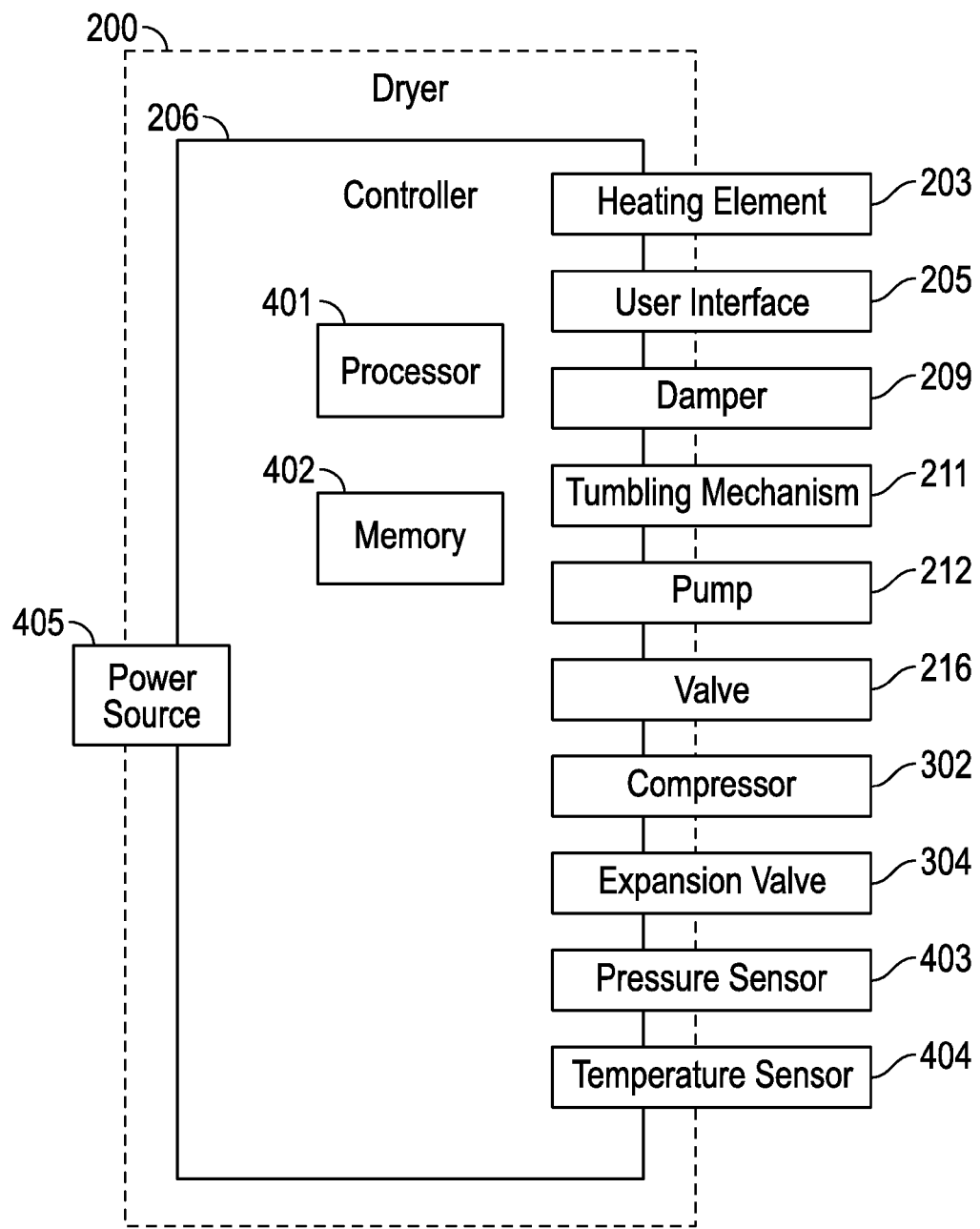
FIG. 4 is a block diagram of a controller of the clothes dryer of FIG. 2.

Referring to FIG. 4, a block diagram of controller 206 is shown. Controller 206 includes processor 401 and memory 402. Memory 402 includes programming modules that, when executed by processor 401, control the operation of dryer 200. Controller 206 controls the operation of dryer 200 based on operational settings provided through user interface 205 as well as feedback signals from pressure sensor 403 and temperature sensor 404. Pressure sensor 403 is configured to sense air pressure in at least drying chamber 202 and provide a feedback signal relating to the sensed air pressure to controller 206. Pressure sensor 403 may be coupled to housing 201. Pressure sensor 403 may be placed within drying chamber 202. In some arrangements, dryer 200 may include a plurality of pressure sensors configured to sense air pressures at various points within and outside of dryer 200 (e.g., within drying chamber 202, within evaporator 301, at exhaust 208, and/or the ambient air pressure). Temperature sensor 404 is configured to sense the temperature within drying chamber 202 and provide a feedback signal relating to the sensed temperature to controller 206. Temperature sensor 404 may be coupled to housing 201. Temperature sensor 404 may be placed within drying chamber 202. In some arrangements, dryer 200 may include a plurality of temperature sensors configured to measure temperatures at various points within and outside of dryer 200 (e.g., within drying chamber 202, within evaporator 301, at exhaust 208, and/or the ambient air temperature).

In addition to sensors 403 and 404, controller 206 is in electrical communication with the various components of dryer 200 such that controller can control the operation of dryer 200. Controller 206 is in communication with heating element 203, user interface 205, damper 209, tumbling mechanism 211 (e.g., the motor that causes rotation of tumbling mechanism 211), vacuum pump 212, valve 216, compressor 302, and expansion valve 304. Controller 206 receives electrical power from power source 405. Power source 405 may provide operational power to all components of dryer 200. Power source 405 may be grid power.

Figure 5:
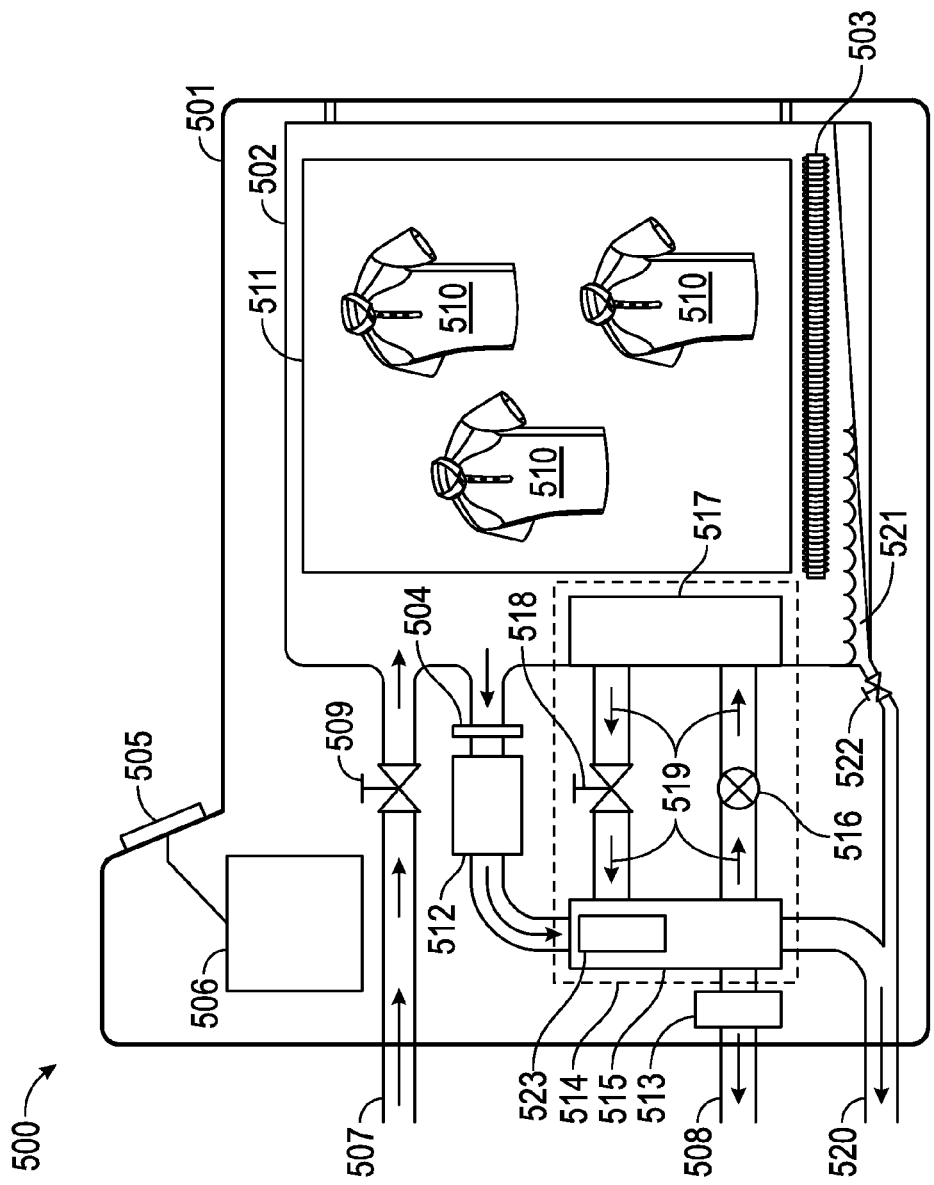
FIG. 5 is a schematic view of a vacuum assisted clothes dryer.

Referring to FIG. 5, a schematic view of vacuum assisted dryer 500 is shown. Dryer 500 is similar to dryer 200. Dryer 500 differs from dryer 200 in that dryer 500 operates at three air pressures. Dryer 500 operates at a high air pressure (e.g., ambient air pressure), a mid-level air pressure (e.g., a first lower-than-ambient air pressure), and a low-level air pressure (e.g., a second lower-than ambient air pressure that is of a lower pressure than the first lower-than-ambient air pressure). Clothes dryer 500 includes a housing 501 that houses a drying chamber 502, heating element 503, a series of air routing pipes, and lint trap 504. User interface 505 is located on the exterior of housing 501. Housing 501 additionally contains controller 506. The air routing pipes include intake 507 and exhaust 508. Intake 507 provides air from the ambient environment into drying chamber 502. Intake 507 includes intake damper 509. As described below, damper 509 may be closed during operation of dryer 500 to assist in reducing the air pressure in drying chamber 502. Damper 509 may be periodically opened during a drying cycle to provide fresh air to drying chamber 502.

Air within drying chamber 502 is heated by heating element 503. Heating element 503 may be an electric heating element or a gas heating element. Heating element 503 heats drying chamber 502, air within drying chamber 502, and articles 510 within drying chamber 502 (shown as articles of clothing). As articles 510 are heated, liquid water contained within articles 510 evaporates into the air within drying chamber 502 at a faster pace than if articles 210 remain at ambient temperature. The drying process may be aided through the use of tumbling mechanism 511 within drying chamber 502.

Exhaust 508 discharges air and water vapor from drying chamber 502. Air and water vapor are evacuated from drying chamber 502 out exhaust 508 by first pump 512 and second pump 513. First pump 512 and second pump 513 are configured to completely evacuate drying chamber 502 or partially evacuate drying chamber 502. Second pump 513 may be configured to at least partially evacuate air from a component of energy recovery system 514. First pump 512 and second pump 513 may be any combination of vacuum pump, a blower, a fan, or the like. For example, first pump 512 may be a fan and second pump 513 may be a vacuum pump. As the air and water vapor are pumped out and away from drying chamber 502, the air and water vapor pass through energy recovery system 514.

Energy recovery system 514 is similar to energy recovery system 213 as described above with respect to FIG. 2 and FIG. 3. Energy recovery system 514 includes a heat pump loop (formed by evaporator 515, compressor 516, condenser 517, expansion valve 518, and heat transfer fluid 519; all operatively connected through hoses and/or pipes). The air and water vapor exiting drying chamber 502 is forced into thermal contact with energy recovery system 514 by first pump 512 and/or second pump 513. Evaporator 515 is configured to transfer sensible thermal energy from the air and water vapor and latent thermal energy released by the water vapor as it condenses into liquid water to heat transfer fluid 519. Water vapor condenser 523 is located within exhaust 508 and causes a portion of water vapor of the water vapor contained in the air to condense into liquid water. Water vapor condenser 523 transfers latent thermal energy from this condensation to evaporator 515. Liquid water formed by condensing water vapor may exit dryer 200 through drain 520. Evaporator 515 may be positioned outside of drying chamber 502, outside of housing 501, or between first pump 512 and second pump 513 along exhaust 508. Heat transfer fluid 519 moves to condenser 517. Condenser 517 is configured to transfer thermal energy from heat transfer fluid 519 to drying chamber 502. Condenser 517 may be located within drying chamber 502. Alternatively, condenser 517 is located adjacent to drying chamber 502. After passing through condenser 517, heat transfer fluid 519 is expanded through expansion valve 518 and back into evaporator 515, where the cycle repeats. In an alternative arrangement, energy recovery system 514 does not include a heat pump loop, and instead includes another fluid heat transfer system. In such an arrangement, evaporator 515 and condenser 517 are replaced with heat exchangers, expansion valve 518 is eliminated, and condenser 516 is replaced by a pump that circulates non-phase-change heat transfer fluid 519. In yet another alternative arrangement, energy recovery system 514 includes a heat exchanger. The heat exchanger may be a gas heat exchanger or a liquid heat exchanger. In another alternative arrangement, energy recovery system 514 includes a heat pipe.

Lint trap 504 may be located upstream of first pump 512, second pump 513, and energy recovery system 514 to prevent lint from entering first pump 512, second pump 513, or energy recovery system 514. As discussed above, energy recovery system 514 captures energy from the air and the water vapor prior to the air and the water vapor exiting through exhaust 508. Energy recovery system 514 may capture both sensible thermal energy, which causes a temperature drop in the air, and latent thermal energy, which is released as the water vapor condenses to liquid water. Condensed water can be removed from the system and drained through drain 520. Liquid water 521 that accumulates in drying chamber 502 may also exit dryer 500 through drain 520. Accordingly, valve 522 may be opened after the drying cycle is complete to allow water 521 to exit. Alternatively, a pump is used in place of valve 522 that can be used to pump liquid water 521 out of low-level pressure of drying chamber 502 to the ambient pressure external to housing 501 during the drying operation.

As noted above, dryer 500 operates at three different air pressures. Dryer 500 operates at a high air pressure (e.g., ambient air pressure), a mid-level air pressure (i.e., a first lower-than-ambient air pressure), and a low-level air pressure (i.e., a second lower-than ambient air pressure that is of a lower pressure than the first lower-than-ambient air pressure). First pump 512 is configured to reduce the air pressure within drying chamber 502 to the low-level air pressure. Second pump 513 is configured to reduce the portion of exhaust 508 path between first pump 512 and second pump 513 to the mid-level air pressure. Evaporator 515 and water vapor condenser 523 are contained within the section of exhaust 508 operating at the mid-level air pressure. Similar to drying chamber 202, drying chamber 502 operates at a lower-than ambient air pressure. By reducing the air pressure within drying chamber 510, the liquid water contained within articles 510 evaporates at a faster pace than at ambient pressure. Accordingly, dryer 500 can operate at a lower temperature than dryer 100 and/or achieve faster drying cycle times. Because dryer 500 operates at a lower temperature than dryer 100, dryer 500 may consume less energy than dryer 100. Further, articles 510 may be exposed to less heat thereby reducing the risk of damaging articles 510 through unnecessary exposure to higher heat levels. Still further, since portions of energy recovery system 514 are placed in the mid-level pressure section of dryer 500, energy recovery system 514 requires less energy to pump thermal energy from evaporator 515 to condenser 517.

The operation of dryer 500 is controlled by controller 506. Controller 506 is similar to controller 206 (as described above with respect to FIG. 4). Controller 506 includes a processor and memory. The memory includes programming modules that, when executed by the processor, control the operation of dryer 500. Controller 506 controls the operation of dryer 500 based on operational settings provided through user interface 5058 as well as feedback signals from at least one pressure sensor and at least one temperature sensor. The at least one pressure sensor is configured to sense air pressure in at least drying chamber 502 and to provide a feedback signal relating to the sensed air pressure to controller 506. The at least one pressure sensor may be coupled to housing 501. The at least one pressure sensor may be placed within drying chamber 502. In some arrangements, dryer 500 includes a plurality of pressure sensors configured to sense air pressures at various points within and outside of dryer 500 (e.g., within drying chamber 502, within evaporator 515, at exhaust 508, and/or the ambient air pressure). The at least one temperature sensor is configured to sense the temperature within drying chamber 502 and to provide a feedback signal relating to the sensed temperature to controller 506. The at least one temperature sensor may be coupled to housing 501. The at least one temperature sensor may be placed within drying chamber 502. In some arrangements, dryer 502 includes a plurality of temperature sensors configured to temperatures at various points within and outside of dryer 500 (e.g., within drying chamber 502, within evaporator 515, at exhaust 508, and/or the ambient air temperature).

In addition to the above noted sensors, controller 506 is in electrical communication with the various components of dryer 500 such that controller can control the operation of dryer 500. Controller 506 is in communication with heating element 503, user interface 505, damper 509, tumbling mechanism 511 (e.g., the motor that causes rotation of tumbling mechanism 511), first vacuum pump 512, second vacuum pump 513, compressor 516, expansion valve 518, and valve 522. Controller 506 receives electrical power from any suitable power source (e.g., grid power). The power source may also provide operational power to all components of dryer 500.

Figure 6:
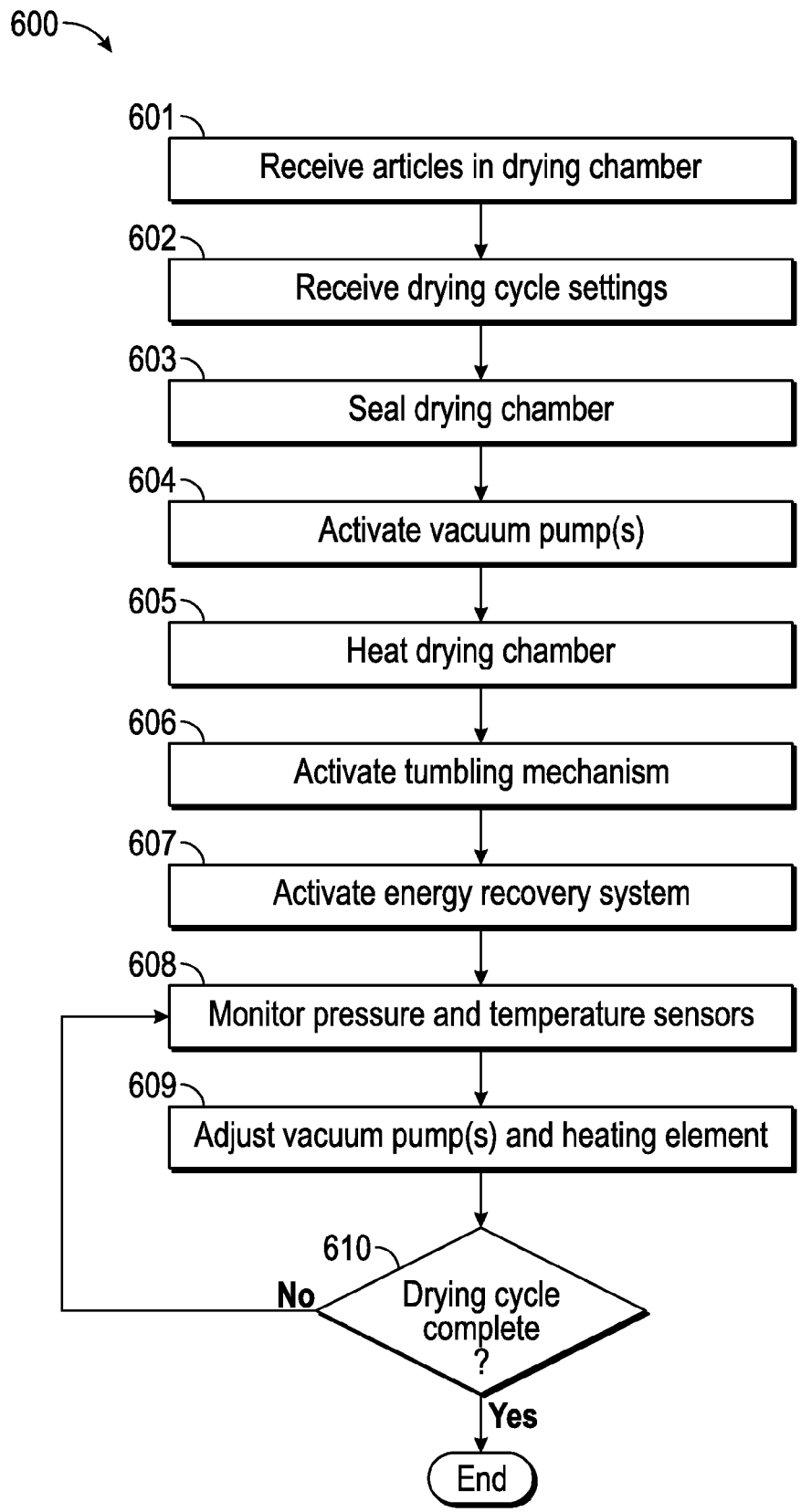
FIG. 6 is a flow chart of a method of drying articles utilizing a vacuum assisted dryer.

Referring to FIG. 6, method 600 of drying articles in a vacuum assisted dryer (e.g., dryer 200 or dryer 500) is shown. Method 600 begins by receiving at least one article to be dried (e.g., damp clothing) in a drying chamber of the dryer (601). The drying chamber may include a tumbling mechanism. Alternatively, the drying chamber may include racks for holding articles to be dried (e.g., dishes) and washing equipment (i.e., the vacuum assisted dryer may be part of a dishwasher). Drying cycle operation instructions and settings are received at a controller of the dryer (602). The instructions and settings are received from a user of the dryer through a user interface (e.g., knobs, dials, buttons, touchscreen, etc.). The settings and instructions may relate to an automatic drying cycle (e.g., a drying cycle that stops based on a sensed level of moisture or humidity from a sensor), a timed drying cycle (e.g., a designated number of minutes or hours), temperature settings (e.g., based on a type of fabric, a set number of degrees, etc.), and/or a desired vacuum level. After the at least one article to be dried is received and the settings and instructions are received, the drying cycle begins.

Further referring to FIG. 6, the drying chamber is sealed (603). The sealing of the drying chamber may be achieved by the user closing a door to the drying chamber. The controller may activate a locking mechanism to prevent the drying chamber from being unsealed during the drying cycle. Additionally, the controller may close any valves that may provide ambient air to the drying chamber (e.g., damper 209 or damper 509). After the drying chamber is sealed, the at least one vacuum pump of the dryer is activated (604). The dryer may contain a single pump (e.g., as in dryer 200) or a plurality of pumps (e.g., as in dryer 500). The pump or pumps may be any combination of vacuum pump, a blower, a fan, or the like. As discussed above with respect to dryer 200 and dryer 500, the pump or pumps reduce the air pressure within the drying chamber such that liquid water evaporates at a faster pace than at ambient pressure, thereby reducing that amount of heat required by the dryer and/or the time it takes to dry articles in the dryer.

The controller activates the heating element of the dryer (605) and activates the tumbling mechanism (606). The heating element heats the drying chamber and the air within the drying chamber to approximately the boiling point of liquid water at the air pressure within the drying chamber. The heating element may be an electric heating element and/or a gas heating element. The tumbling mechanism agitates the articles within the drying chamber to assist with the drying process. Additionally, the controller activates the energy recovery system (e.g., energy recovery system 213 or energy recovery system 514 as discussed above) (607). The energy recovery system is configured to capture both sensible thermal energy, which causes a temperature drop in the air, and latent thermal energy, which is released as the water vapor carried by the exhaust condenses to liquid water.

During the drying cycle, the controller monitors sensed pressure levels and sensed temperature levels based on feedback from pressure sensors and temperature sensors within the dryer (608). The dryer includes a pressure sensor configured to sense the air pressure within the drying chamber. The dryer may include additional pressure sensors configured to sense the air pressure at various points within and outside of the dryer (e.g., within the energy recovery system and/or the ambient air pressure). The dryer includes a temperature sensor configured to detect the temperature within the drying chamber. The dryer may include additional temperature sensors configured to sense the air temperature at various points within and outside of the dryer (e.g., within the energy recovery system and/or the ambient air temperature). Based on the feedback from the various sensors, the controller of the dryer adjusts the vacuum pump(s) and the heating element (609). The vacuum pump or pumps are adjusted to maintain a desired vacuum level within the drying chamber and/or within other components of the dryer (e.g., within the energy recovery system). The heating element is adjusted to maintain a desired temperature within the drying chamber.

Throughout the drying cycle, the controller determines whether the drying cycle is complete (610). The drying cycle may be complete based on an expiration of time (e.g., if the instructions and settings received included a timed drying cycle) and/or a detected level of moisture (e.g., as sensed from a humidity sensor within the drying chamber). Alternatively, the drying cycle may be ended based on an input received from the user (e.g., a stop command received from the user interface). When the end of the drying cycle has been reached, the drying cycle ends. The controller stops the at least one vacuum pump, the heating element, the tumbling mechanism, and the energy recovery system. If the dryer includes a drying chamber lock, the drying chamber is unlocked such that the user can remove the articles.

The above recited steps may be performed in the above order, a different order, or at the same time. For example, method 600 may correspond to a drying cycle of a vacuum assisted clothes dryer (e.g., dryer 200 or dryer 500). Once the clothes are received in the drying chamber and the drying cycle settings are received, all of the remaining steps may be performed simultaneously throughout the drying cycle until the end of the drying cycle.

The above discussed drying devices and methods are applicable to drying devices beyond clothes dryers. For example, other household appliances, such as dishwashers, employ drying cycles that may be modified to be vacuum assisted in the same manner as discussed above with respect to dryer 200 and/or dryer 500. In this example, the drying chamber will include at least one rack (e.g., a slidable rack that slides in and out of the drying chamber) for holding dishes and washing equipment (e.g., spray nozzles, soap dispensers, rinse aid dispensers, water heating devices, and any plumbing necessary to provide water to the dishwasher). As an additional example, industrial dryers are often used in various manufacturing processes. Vacuum assisted dryers can be employed to decrease drying times for manufactured parts and/or to reduce energy costs.

It is important to note that the construction and arrangement of the elements of the systems and methods as shown in the exemplary embodiments are illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the enclosure may be constructed from any of a wide variety of materials that provide sufficient strength or durability, in any of a wide variety of colors, textures, and combinations. Accordingly, all such modifications are intended to be included within the scope of the present inventions. The order or sequence of any process or method steps may be varied or re-sequenced according to alternative embodiments. Other substitutions, modifications, changes, and omissions may be made in the design, operating conditions, and arrangement of the preferred and other exemplary embodiments without departing from scope of the present disclosure or from the spirit of the appended claims.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps, and decision steps.

What is claimed is:

1. A dryer, comprising:
a housing;
a drying chamber disposed within the housing;
a heating element;
an intake configured to supply intake air to the drying chamber;
an exhaust configured to vent exhaust air out of the drying chamber;
a first pump coupled to the housing and positioned along the exhaust;
a second pump positioned along the exhaust; and
an energy recovery system coupled to the housing;
wherein the first pump is configured to reduce the air pressure within the drying chamber; and
wherein the energy recovery system comprises a heat transfer fluid and is configured to use the heat transfer fluid to transfer thermal energy from the exhaust air to the drying chamber.

2. The dryer of claim 1, wherein the pump is positioned along the exhaust.

3. The dryer of claim 2, wherein a component of the energy recovery system is positioned along the exhaust, and wherein the first pump is positioned along the exhaust between the component and the drying chamber.

4. The dryer of claim 3, wherein the component operates at approximately an ambient air pressure.

5. The dryer of claim 1, wherein the energy recovery system includes a heat pump configured to transfer heat via the heat transfer fluid.

6. The dryer of claim 5, wherein the heat pump includes a condenser and an evaporator for the heat transfer fluid.

7. The dryer of claim 6, wherein the evaporator is positioned along the exhaust.

8. The dryer of claim 6, wherein the condenser is positioned in or adjacent to the drying chamber such that the condenser is configured to provide thermal energy to the drying chamber.

9. The dryer of claim 1, wherein the drying chamber is sealed such that the drying chamber can maintain a lower-than-ambient air pressure.

10. The dryer of claim 9, wherein the pump is configured to evacuate air from the drying chamber.

11. A dryer, comprising:
a housing;
a drying chamber disposed within the housing;
a heating element;
an intake configured to supply intake air to the drying chamber;
an exhaust configured to vent exhaust air out of the drying chamber, wherein the exhaust includes an opening configured to vent the exhaust air out of the housing;
an energy recovery system having at least a portion positioned along the exhaust;
a first pump coupled to the housing and positioned along the exhaust between the portion of the energy recovery system and the drying chamber; and
a second pump coupled to the housing and positioned along the exhaust between the portion of the energy recovery system and the opening;
wherein the first pump and the second pump are configured to reduce the air pressure within the drying chamber to a low pressure that is below an ambient pressure; and
wherein the energy recovery system comprises a heat transfer fluid, and is configured to use the heat transfer fluid to transfer thermal energy from the exhaust air to the drying chamber.

12. The dryer of claim 11, further comprising a water condenser coupled to the exhaust and configured to condense water vapor from the exhaust air, wherein the water condenser is positioned along the exhaust between the first pump and the second pump.

13. The dryer of claim 11, further comprising a water condenser coupled to the exhaust and configured to condense water vapor from the exhaust air, wherein the water condenser operates at a mid-level pressure, wherein the mid-level pressure is between the ambient pressure and the low pressure within the drying chamber.

14. The dryer of claim 11, wherein the first pump is a vacuum pump.

15. The dryer of claim 14, wherein the second pump is a vacuum pump.

16. The dryer of claim 14, wherein the second pump comprises a fan or a blower.

17. The dryer of claim 11, wherein the first pump comprises a blower or a fan.

18. The dryer of claim 17, wherein the second pump is a vacuum pump.

19. The dryer of claim 11, wherein the portion of the energy recovery system operates at a mid-level pressure, wherein the mid-level pressure is between the ambient pressure and the low pressure within the drying chamber.

20. The dryer of claim 11, further comprising a first pressure sensor coupled to the housing and configured to sense the pressure within the drying chamber.

21. The dryer of claim 11, wherein the drying chamber is sealed such that the drying chamber can maintain the low pressure.

22. The dryer of claim 21, wherein the first pump is configured to evacuate air from the drying chamber.

23. A clothes dryer, comprising:
a housing;
a drying chamber disposed within the housing;
a heating element;
an intake configured to supply intake air to the drying chamber;
an exhaust configured to vent exhaust air out of the drying chamber;
a first pump coupled to the housing and positioned along the exhaust;
a second pump positioned along the exhaust; and
an energy recovery system coupled to the housing;
wherein the first pump is configured to reduce the air pressure within the drying chamber; and
wherein the energy recovery system is configured use a heat transfer fluid to transfer thermal energy from the exhaust air to the drying chamber.

24. The clothes dryer of claim 23, wherein a component of the energy recovery system is positioned along the exhaust, and wherein the first pump is positioned along the exhaust between the component and the drying chamber.

25. The clothes dryer of claim 24, wherein the component operates at approximately an ambient air pressure.

26. The clothes dryer of claim 23, wherein the second pump is positioned between the component and an exit out of the housing of the exhaust.

27. The clothes dryer of claim 23, wherein the component operates at a mid-level pressure, wherein the mid-level pressure is an air pressure between a low pressure of the drying chamber and an ambient air pressure outside of the housing.

28. The clothes dryer of claim 23, wherein the energy recovery system includes a heat pump configured to transfer heat via the heat transfer fluid.

29. The clothes dryer of claim 28, wherein the heat pump includes a condenser and an evaporator for the heat transfer fluid.

30. The clothes dryer of claim 29, wherein the evaporator is positioned along the exhaust.

31. The clothes dryer of claim 30, wherein the evaporator is configured to condense water vapor into liquid water, and wherein the evaporator is configured to receive latent thermal energy released as water vapor in the exhaust air condenses into liquid.

32. The clothes dryer of claim 28, wherein the condenser is positioned in or adjacent to the drying chamber such that the condenser is configured to provide thermal energy to the drying chamber.

33. The clothes dryer of claim 23, wherein the drying chamber is sealed such that the drying chamber can maintain a lower-than-ambient air pressure.

34. The clothes dryer of claim 33, wherein the first pump is configured to evacuate air from the drying chamber.

\* \* \* \* \*